United States Patent [19]

Lowdenslager

[11] 3,729,674

[45] Apr. 24, 1973

[54] DIGITAL NUCLEAR GYROSCOPIC INSTRUMENTATION AND DIGITAL PHASE LOCKED LOOP THEREFOR

[75] Inventor: John R. Lowdenslager, Chappaqua, N.Y.

[73] Assignee: The Singer Company, New York, N.Y.

[22] Filed: Dec. 2, 1970

[21] Appl. No.: 94,263

[52] U.S. Cl. ....................................324/0.5 R, 331/3

[51] Int. Cl. ............................................G01n 27/78

[58] Field of Search................................235/150.25; 324/0.5 R; 331/3, 94

[56] References Cited

UNITED STATES PATENTS

| | | | |
|---|---|---|---|
| 3,103,620 | 9/1963 | Fraser | 324/0.5 R |
| 3,103,621 | 9/1963 | Fraser | 324/0.5 R |
| 3,103,623 | 9/1963 | Greenwood, Jr. | 324/0.5 R |
| 3,103,624 | 9/1963 | Greenwood, Jr. et al | 324/0.5 R |
| 3,239,752 | 3/1966 | Greenwood, Jr. | 324/0.5 R |
| 3,368,160 | 2/1968 | Helgesson | 331/3 |
| 3,524,127 | 8/1970 | Conklin et al. | 324/0.5 R |
| 3,551,793 | 12/1970 | Freeman et al. | 324/.5 R |

*Primary Examiner*—Benjamin A. Borchelt
*Assistant Examiner*—G. E. Montone
*Attorney*—S. A. Giarratana and Thomas W. Kennedy

[57] ABSTRACT

A pair of spin generators maintained parallel to each other, but in opposite directions thereto, are phase locked with respect to each other and an output is provided indicative of the inertial reference. Both spin generators include different sets of nuclei which resonate at two different distinct frequencies. A first crystal oscillator is initially phase locked with respect to one of the spin generators through the use of a dividing circuit, a multi-bit register, and a proportional field control for that spin generator. Similarly, the other spin generator is coupled to strobe a second multi-bit register which is coupled to the dividing circuit so as to provide a phase difference signal from the output of the second shift register, which phase difference signal is indicative of the difference in phase between the two spin generators. A second crystal oscillator oscillating at a frequency different from the first crystal oscillator is coupled to a second dividing circuit to a third multi-bit register which is coupled to the first spin generator. Additional pulses can be added to or removed from the path between the crystal oscillator and the second dividing circuit, so as to phase-lock the output of the second divider circuit with a second frequency output of the first spin generator. The second dividing circuit is coupled to the second spin generator by means of a fourth register. The outputs of the second and fourth registers are subtracted, one from the other through a difference circuit to control the south field proportional field control. The phase difference registers are also fed through a summing adder to provide the nuclear inertial output reference. A digital phase locked loop is provided for an input signal at a frequency $f_s$. An $n$-stage counter is driven with a $2^n x f_s$ coherent source. The input signal and the output of the $n$-stage counter are coupled to a phase detector which samples the phase of the input signal. The detected signal is periodically integrated. The integrated signal is coupled to an analog to digital converter whose output controls a pulse advance or retard means which is serially coupled between the coherent source and the counter.

5 Claims, 4 Drawing Figures

INVENTOR.
John R. Lowdenslager
BY
S. A. Giarratana
Thomas P. Kennedy
ATTORNEYS

INVENTOR.
John R. Lowdenslager
BY
[signature]
[signature]
ATTORNEYS

DIGITAL NUCLEAR GYROSCOPIC INSTRUMENTATION AND DIGITAL PHASE LOCKED LOOP THEREFOR

BACKGROUND OF THE INVENTION

1. Field of the Invention

This invention relates to digital nuclear gyroscopic instrumentation systems and to digital phase locked loops therefore.

2. Description of the Prior Art

Prior art gyroscopic devices, generally, use mechanical components, such as mechanical resolvers, mechanical servo loops, and the like. Gyroscopes in general, are of the mechanical design.

Various United States Patents relating to the field of nuclear gyroscopes and direction sensors, pertinent to the subject matter at hand, and assigned either directly or by mesne assignment to the assignee of this present invention, are as follows: U.S. Pat. No. 3,103,620 to Fraser, Sept. 10, 1963; No. 3,103,621 to Fraser, Sept. 10, 1963; No. 3,103,623 to Greenwood Jr., Sept. 10, 1963; No. 3,103,624 to Greenwood Jr. et al., Sept. 10, 1963; No. 3,491,286 to Simpson, Jan. 20, 1970; and No. 3,524,127 to Conklin, et al., Aug. 11, 1970.

Fraser, in his '621 patent, describes an optically pumped magnetic resonance direction sensor, wherein two substantially equal and opposite unidirectional magnetic fields spaced from each other and parallel to the common axis are provided. A container encloses two dissimilar substances, each exhibiting magnetic resonance when properly excited, located in one of the fields and a second identical container located in a second unidirectional field. The containers are irradiated with energy at the resonance frequency of at least one of the substances in the containers. Associated with each unidirectional field is an alternating magnetic field which has a frequency equal to the Larmor frequency of each substance to cause forced precession of the magnetic moments of the substance about the axis of the unidirectional fields. The precessional frequencies of the magnetic moments of the substances are detected and read out. The phase of the signals corresponding to the precessional frequency of similar substances in the two fields are compared and signals are provided for indicating the magnitude and direction of any phase shift.

Greenwood ('623) provides an arrangement by which suitable instrumentation is coupled to two or more aggregations or samples of nuclei so as to discern changes in the inertial frame orientation relative to inertial space.

This is achieved by employing two magnetic gaps having unidirectional magnetic fields, parallel but oppositely directed, to each other. Magnetic gaps are formed in a magnetic structure rigidly associated with the remainder of the apparatus. A nuclear sample is positioned in each field, each of the samples containing the same kind of nuclei. Four nuclear magnetic resonance signals are derived from excited nuclei. By phase comparison methods, one pair of signals is fed back to control the magnetic field strength so as to eliminate any requirement for any independent knowledge of the absolute field magnitude. From the other pair of the four signals, there is derived a signal representing the integral of the rate of rotation of the apparatus about one of its magnetic field directions.

This rate of rotation is relative to inertial space. Forced precession and free precession methods may be used to excite the nuclei and derive the nuclear magnetic resonance signals therefrom. The F. Bloch induction method, described in U.S. Pat. No. Re. 23,950, associated with the Hershberger regenerative feedback circuit which eliminates need for external oscillators to excite the nuclei, as described in U.S. Pat. No. 2,589,494 may be employed and may be termed a spin generator.

Greenwood ('624) derives an output signal from two nuclear magnetic resonance signals, phases rather than frequencies being compared because of the extreme accuracy required. An error signal is derived from one of the nuclear magnetic resonance signals and is made to control either the unidirectional magnetic field strength or the alternating magnetic field frequency. From the other nuclear magnetic resonance signal, a phase difference signal is derived which is employed in securing the desired output quantity.

As Conklin ('127) suggests, before describing the invention in detail, it might be helpful to briefly consider some fundamental aspects of nuclear magnetic resonance theory. The following explanation is confined only to those concepts which are necessary for a proper understanding of this invention. If the reader is interested in the more extensive treatment on the subject of magnetic resonance he is directed to the above cited patent Bloch et al. or to standard texts on atomic theory. In accordance with the principles of quantum mechanics, it is known that certain nuclei possess a magnetic moment due to nuclear angular momentum or spin. The dual properties of magnetic moment and angular momentum behave as parallel vectors and are related to each other by the proportionality $\gamma$ referred to as the gyromagnetic ratio. The ratio is given by $$(2\pi\mu)/(Ih)$$

Where $\mu$ is the maximum measurable component of the magnetic moment, $I$ is the nuclear spin member and $h$ is Planck's constant.

The reader is further directed to the patent of Conklin '127 for additional background explanation.

One form of prior art apparatus for tracking the phase of an input signal includes a mechanical resolver which is positioned by exciting several phase windings of its stator with alternating current. The rotor of the resolver is positioned by a phase detector and servo motor and amplifier. Disadvantageously, such apparatus is expensive, has moving parts, and requires complicated multiphase excitation; the duty cycle of its output signal is not precise.

Another form of prior art phase tracking apparatus includes a voltage controlled oscillator driven by a phase detector and a dc amplifier in a loop. Disadvantageously, the voltage controlled oscillator in a phase locked loop must first be positioned close to the input frequency before it will acquire. That is, it requires an acquisition mode. It is difficult to control the frequency output characteristic of an oscillator as a function of input voltage. Therefore, any drift must be countered by a corresponding phase error. Once the loop is acquired, the short term stability of the oscillator causes fluctuation. The output is not a precise 50 percent duty cycle.

Still another form of prior art apparatus for phase tracking includes a voltage controlled delay in a loop using an integrator and a phase detector. Disadvantageously, the voltage control delay device suffers from the fact that less than 360° of delay is normally obtainable with a single unit, so that two should be used in tandem to provide the desired delay. At least three units are required for an accurate 50 percent duty cycle at the output. The delay operation must be conducted at twice the frequency and then divided down. The device is also subject to saturation when the phase rotates over one cycle.

THE SPIN GENERATOR

A crystal oscillator, depends, frequency and phase, on mechanical excitation and characteristics of the crystal.

A spin generator is an oscillator which is in many respects, similar to a crystal oscillator, except that it is a nuclear magnetic resonance device which depends on precession of a magnetic moment about a dc magnetic field in space, and is direction sensitive.

In general, nuclear generators may be said to depend for its operation on the property of rigidity in space, similar to that of a free gyroscope. However, unlike the free gyroscope, they have little or no drift or accumulated error in its direction indications this virtue being obtained by basing the operation on the properties of sub-atomic particles.

The spin generator includes, basically, a feedback amplifier, which has in its feedback loop a frequency sensitive device, such as an aggregate of nuclei. As an example, odd numbered isotopes of mercury may be used. A spin generator can be provided with just one isotope. It is odd numbered so that the charges are not matched, so that an extra charge is provided in the nucleus. Hence, in a spin generator, the nucleus contains an odd number of protons. Otherwise, if the protons were even numbered, they would be matched back to back; they spin and any generated magnetic field would be cancelled out.

The charged nucleus rotates. Because it rotates, it obeys a right hand rule, which says if you put your fingers in the direction that it is rotating, your thumb indicates the direction of the magnetic field. This spinning nucleus can be thought of as a magnetic dipole in space. Because every nucleus has a mass, and a mechanical axis, it can be thought of, also, as a mechanical element which obeys the laws that are established for any gyroscope. That is, its axis of rotation will move in a circle or precess if a torque be applied to it outside of the plane of its rotation.

A sample of numerous nuclei are placed within a small magnetic field. The nuclei will align themselves to the magnetic field because each nucleus is a magnetic dipole. If the field were to be suddenly changed so that it is at right angles to the direction in which all the nuclei were aligned, then a torque will be applied. If the externally applied magnetic field rotated suddenly at 90°, all the nuclei will tend to be pulled up into the new magnetic field. When this occurs, they precess, because they are also gyroscopes. The precessing nuclei effectively act as a precessing magnetic field which will describe in space a rotating frequency. This precessional frequency is proportional to the applied magnetic field. The constant of proportionality is called the gyro-magnetic or magneto gyric ratio which is represented by $\gamma$. This rotation takes place in free inertial space.

The nuclei precess in space, creating an electric field that can be picked up by a magnetic coil. Similarly, the nuclei can be acted upon by a magnetic coil. With a magnetic coil, the frequency can be sensed and measured. If an observer, or observer coil, is rotating in the same direction as the precession, an apparent frequency is obtained which will be lower and if the observer is rotating in the opposite direction, the apparent frequency will be higher. The frequency at which the nuclei spins is fixed and known. When an observer's platform is spinning around the same axis, a different frequency would be observed. By integrating this frequency, a phase angle is obtained which is proportional to the angle through which the device has rotated. To that extent, it is a gyroscope. The problem, then, is to measure the phase shift. This measurement can be obtained by simply changing the magnetic field, and by measuring the precessing electric vector. By exciting the nuclei with an ac field, the vector ( which is a summation of many tiny vectors for the many nuclei) precesses and will either be leading, lagging, or in phase depending as the frequency of the excitation is equal to, greater than, or less than this precessional frequency. In other words, by applying a rotating magnetic field, the nuclei will tend to follow the field, just like a synchronous motor, and depending as the frequency is higher or lower than the motor spins, the applied field will be either in or out of phase, leading or lagging the signal. For example, a nuclear spin generator can be constructed by using mercury pumped with ultraviolet light. The mercury vapor is pumped with the same wavelength of light that the mercury isotope gives off, such as 2,537 Angstrom ultraviolet light. The mercury nuclei are excited in the similar manner as pumping excites a laser. At the same time, an ac magnetic field is applied with coils to the sample. Advantageously, one of the properties of mercury is that the rotation of the precessing vector intensity modulates the pumping beam going through it, so that an optical readout can be obtained.

Thus, one form of spin generator has a read-in and a read-out, and it has a transfer characteristic: magnetic in and optical out. The output modulation component is read out on a light beam which is detected by a photomultiplier tube which is coupled to the input of an amplifier, the output of the amplifier going back to the magnetic excitation.

SUMMARY OF THE INVENTION

Another object of this invention is to provide new and improved digital nuclear gyroscopic instrumentation and digital phase locked loops therefor.

Yet another object of this invention is to provide for new and improved digital phase locked loops.

Still another object of this invention is to provide for a novel digital phase-locked loop which is solid state in construction and has no mechanical moving parts.

Yet another object of this invention is to provide for a novel digital phase locked loop which is highly stable, can be rotated indefinitely in one direction over extremely large numbers of cycles without saturation, and when an input signal is removed, remains locked in phase.

Another object of this invention is to provide for a new and improved digital phase locked loop which is inexpensive compared to corresponding devices of the prior art.

With these and other objects in mind, digital nuclear gyroscopic instrumentation can be provided having phase locked loops therein. This can be achieved by a north nuclear spin generator having a field control therefor and having an upper output frequency and a lower output frequency. Strobing signals controlled by the north spin generator are produced at the upper frequency rate. A crystal oscillator is provided, together with means for phase locking the crystal oscillator to the north spin generator. The phase locking means includes a frequency dividing circuit for receiving the output from the crystal oscillator and for providing a binary output therefrom, a first error register coupled to receive the binary output from the dividing circuit and a strobing signal at the north spin generator upper frequency rate, and the output of the error register is coupled to control proportionally the field for the north spin generator. Similarly, a south spin generator is provided having a field control therefor, in addition to a second error register coupled to receive the output from the dividing circuit. Strobing signals, controlled by the south spin generator are applied to the second error register, whereby the second error register provides an output therefrom indicative of the phase difference between the south spin generator and the north spin generator. A second crystal oscillator, oscillating at a frequency different from the first crystal oscillator, is coupled to a second dividing circuit. The north spin generator's second output is coupled to strobe a third error register so that synchronization of the output of the second dividing circuit with the strobing signals occurs. The output of the second dividing circuit is phase locked to the strobe pulse applied to the third error register. The signal strobed into the third error register has the identical scale as the first error register. Thus, after each strobe pulse is applied to the third error register, a new number is shifted therethrough, the output phase of the second dividing circuit being either advanced or retarded by the number stored in the third error register. The output of the second dividing circuit is strobed, by a pulse controlled by the south spin generator, into a fourth error register. The outputs from the second and the fourth error registers are coupled and combined through a subtractor circuit. The output from the subtractor circuit is coupled to control the field of the south spin generator. An adder is provided to receive the outputs from the second and fourth error registers for providing an output therefrom indicative of the inertial output reference.

In accordance with certain features of this invention, a combination is provided including a first spin generator having a first unidirectional magnetic field aligned along a first fixed axis. A first container, located in the field, encloses two sets of dissimilar subatomic particles, each exhibiting magnetic resonance when properly excited. The first container is irradiated with energy at the resonance frequency of at least one of the sets of particles. An alternating magnetic field, associated with the first unidirectional field, is produced having a frequency equal to the Larmor frequency of each set of particles to cause forced precession of magnetic moments of the particles about the axis. Means are provided for varying the unidirectional field. The precessional frequencies of the particles can be detected, the precessional frequency of one set of particles having a nominal frequency $f_1$, the precessional frequency of the other set of particles having a nominal frequency $f_2$. A second spin generator has a unidirectional magnetic field substantially equal to the first unidirectional field aligned along a fixed axis parallel to the first fixed axis and in a direction opposite to the first unidirectional field. A container encloses dissimilar subatomic particles corresponding to those enclosed by the first container. The second spin generator container is irradiated with energy at the resonance frequency of at least one of the sets of particles. An alternating magnetic field, associated with the second spin generator unidirectional field, is provided having a frequency equal to the Larmor frequency of each set of particles to cause forced precession of magnetic moments of the particles about the second spin generator fixed axis. Means are provided for varying the second spin generator unidirectional field. The precessional frequencies of the particles, enclosed by the second spin generator container, are detected, the precessional frequency of one set of particles having the nominal frequency $f_1$, the precessional frequency of the other set of particles having the nominal frequency $f_2$. A first strobing means, including a filter at the frequency $f_1$ and pulse shaping means, is coupled to the first spin generator for providing strobing pulses at the nominal frequency $f_1$ in synchronism therewith. A second strobing means, including a filter at the frequency $f_1$ and pulse shaping means, is coupled to the second spin generator for providing strobing pulses at the nominal frequency $f_1$ in synchronism therewith. A third strobing means, including a filter at the frequency $f_2$ and pulse shaping means, is coupled to the first spin generator for providing strobing pulses at the nominal frequency $f_2$ in synchronism with the first spin generator. A fourth strobing means including a filter at the frequency $f_2$ and pulse shaping means, is coupled to the second spin generator for providing strobing pulses at the nominal frequency $f_2$ in synchronism with the second spin generator. Two crystal oscillators having resonance frequencies $2^n f_1$ and $2^n f_2$, respectively, are provided, wherein n is a positive integer. A first frequency dividing circuit is coupled to the first crystal oscillator for providing a binary output along *n* output lines therefrom at a cyclic rate $f_1$. A second frequency dividing circuit is coupled to the second crystal oscillator and is adapted to provide a binary output along n output lines therefrom at a cyclic rate $f_2$. The nominal frequency $f_1$ for the first spin generator is phase locked with the first crystal oscillator so that it is in synchronism therewith by an n stage flip flop register having input terminals coupled to the first frequency dividing circuit and a strobing terminal coupled to the first strobing means for gating signals from the first dividing circuit into the register, together with means coupled to the output of the *n* stage flip flop register for controlling the first spin generator undirectional field. The output of the second frequency dividing circuit is maintained in synchronism with the nominal frequency $f_2$ of the first spin generator by a second $n$ stage flip flop register having input terminals coupled to the second frequency dividing circuit and a strobing terminal coupled to the third strobing means for gating signals from the second dividing circuit into the second $n$ stage register, and a proportional advance or retard means having an input coupled to the second crystal oscillator, an output coupled to the second dividing circuit, and control inputs coupled to the output of the second n stage register for adding or deleting pulses to the second dividing circuit so that the second dividing circuit comes into synchronism with the nominal frequency $f_2$ of the first spin generator. A third $n$ stage flip flop register has input terminals coupled to the output of the first dividing circuit and has a strobing terminal coupled to the second strobing means for gating signals from the first dividing circuit thereinto. A fourth $n$ stage flip flop register has input terminals coupled to the output of the second dividing circuit and has a strobing terminal coupled to the fourth strobing means for gating signals from the second dividing circuit thereinto. The second spin generator is maintained in synchronism with the first spin generator by a digital subtractor circuit coupled to the outputs of the third and fourth $n$ stage registers for providing a difference signal therefrom, the difference signal controlling the second spin generator unidirectional field. The outputs of the third and fourth n stage registers are coupled through a first digital adding means for providing a summing signal therefrom indicative of inertial output reference.

In accordance with other aspects of the invention, an averaging circuit is coupled to the first digital adding means. The averaging circuit, in one configuration, includes a second adding circuit. A multi-stage register has an input terminal coupled to the output terminal of the second adding circuit. A subtracting circuit has a first input terminal thereof coupled to the output of a right-shifting means. A second input terminal of the subtracting circuit is coupled to the output of the first digital adding means. The output terminal of the subtracting circuit is coupled to the first input terminal of the second adding circuit, and signals are provided indicative of differential data of the inertial output reference. The output terminal of the multi-stage register is coupled to the second input terminal of the second adding circuit. Signals are provided at the output of the right shift means. indicative of average data for $x$ bits corresponding to the inertial output reference, wherein $x$ represents the number of stages in the output of the right shift means.

In accordance with other features of the invention, a crystal oscillator having a resonance frequency $2^n f_1$ and a spin generator having particles which are caused to precess at a nominal frequency $f_1$ can be phase locked together in synchronism. The precessional frequency of the particles of the spin generator are detected, coupled to a filter at the frequency $f_1$, and pulse shaping means to provide strobing pulses at the nominal frequency $f_1$ in synchronism with the spin generator. A frequency dividing circuit coupled to the crystal oscillator provides a binary output along a plurality of lines therefrom at cyclic rate $f_1$. A multi-stage flip flop register has input terminals coupled to the frequency dividing circuit, and has a strobing terminal coupled to receive the strobing pulses for gating signals from the dividing circuit into the register. The output of the multi-stage flip flop register controls the spin generator unidirectional field, completing the loop, to thereby phase lock the nominal frequency of the spin generator in synchronism with the crystal oscillator. In accordance with certain features of the invention, apparatus is described which provides a square wave output signal at substantially a repetition rate $f_s$, having a phase closely approximating the phase of an input signal at the corresponding frequency rate. In one embodiment, such an apparatus includes a source of signals having a frequency rate of $2^n \times f_s$ and an n stage binary counter. The counter provides a square wave output signal therefrom at a frequency rate of $1/2^n$ that of a signal applied to the input thereof. A phase detector receives both the input signal and the output of the binary counter to provide a signal representative of the phase difference between its inputs. The phase detector output is coupled to an integrator means which is reset periodically by the counter. An analog to digital converter is coupled to the integrating means for producing a digital output therefrom corresponding to the integrated phase representative signal applied thereto. Control means, which couples the source of signal to the counter, advances and retards the phase of the square wave output signal proportional to the digital output.

In accordance with further features of the invention, such apparatus for providing a square wave output signal at substantially a repetition rate $f_s$, having a phase closely approximating the phase of an input signal at the frequency rate $f_s$, includes, as before, a source of signals having a frequency rate of $2^n \times f_s$ and an $n$ stage binary counter. The counter provides a square wave output signal therefrom at a frequency rate of $1/2^n$ that of a signal applied to the input thereof. A phase detector receives both the input signal and the output from the binary counter for providing a signal therefrom representative of the phase of the input signal. A level discriminator, coupled to the output of the phase detector provides an "advance" signal along one output line therefrom and a "retard" signal along a second output line therefrom in a selective fashion. Control means, coupling the source of signals to the counter, advances and retards the phase of the square wave output signal proportional to the output from the level discriminator. In accordance with specific features of the invention, the $n$ stage binary counter further includes $n$ outputs therefrom for carrying data indicative of the instantaneous state of the counter. A second $n$ stage binary counter and means for coupling the source of signals through the second counter operate, in combination, to provide a reference phase. A digital output for representing the difference between the phase of the input signal and the reference phase is provided by circuitry including $n$ two-input AND gates, one input of each of the gates being coupled to a corresponding one of the $n$ outputs of the first binary counter, the second input of each of the gates being coupled to the output of the second counter, so that the $n$ outputs thereof indicate the digital output phase difference.

In accordance with still other features of this invention, apparatus is described which provides a square wave output signal at substantially a repetition rate $f_s$ having a phase closely approximating the phase of an input signal at the frequency rate $f_s$. Such apparatus includes a source of signals having a frequency rate $2^n \times f_s$. An $n$ stage binary counter provides a square wave output signal therefrom at a frequency rate $1/2^n$ that of a signal applied to the input thereof, and n outputs therefrom for carrying data indicative of the instantaneous state of the counter. The input signal is converted into a train of pulses having a repetition rate of $f_s$. N two-input AND gates are provided, wherein one input of each of the gates is coupled to a corresponding one of the $n$ outputs from the counter. The second inputs of the gates are coupled to receive the train of pulses. Control means, coupling the source of signals to the counter, advances and retards the phase of the square wave signal in accordance with the states of the AND gates. The carry of the counter, occurring when the counter fills and resets to zero, coincides with the pulse of the train so that the output waveform of the counter tracks the input signal phase.

DESCRIPTION OF A PREFERRED EMBODIMENT

Figure 1:
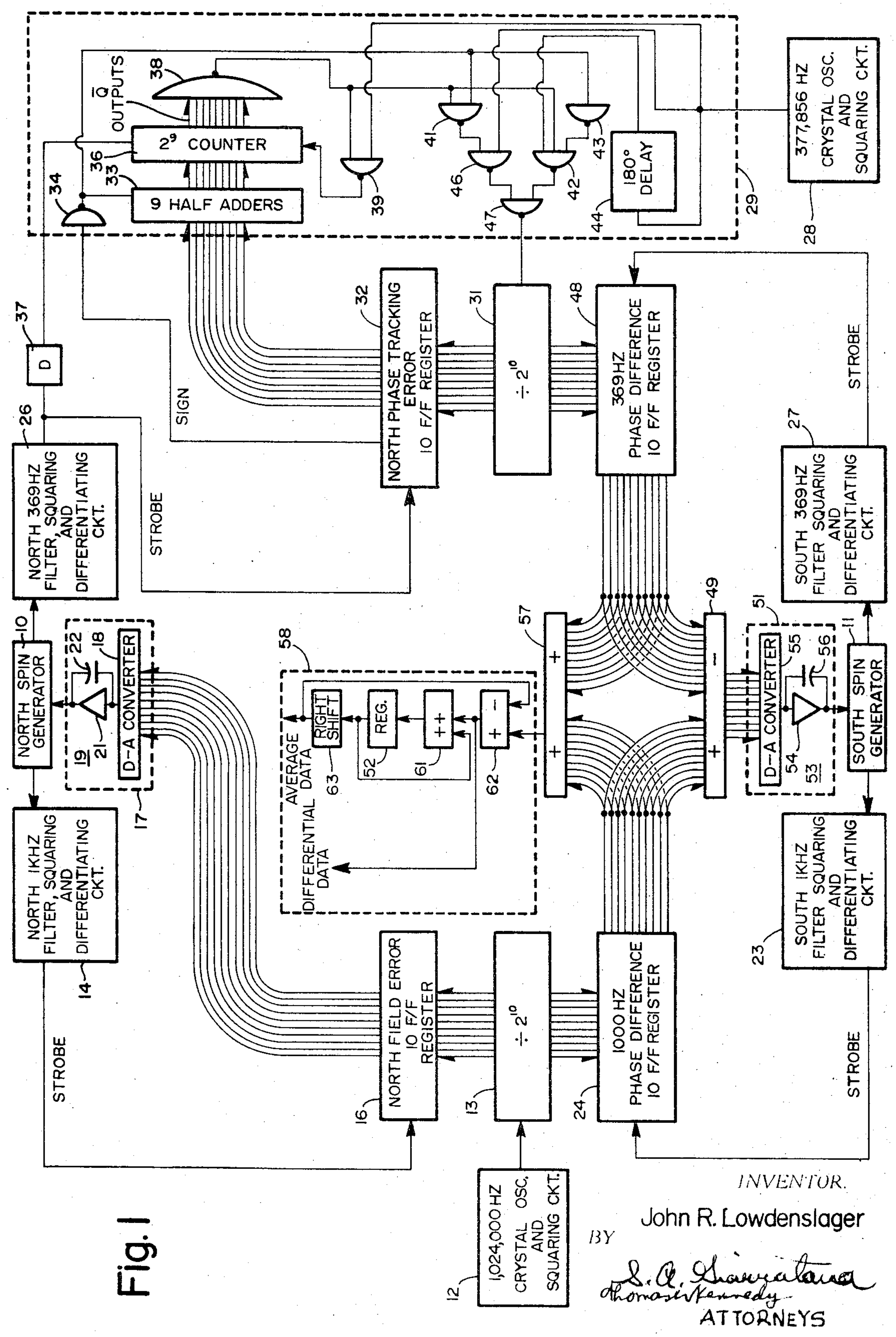

Referring to FIG. 1, there is shown a schematic diagram of one embodiment of this invention, including a pair of spin generators 10 and 11. The spin generator 10, for purposes of clarity and differentiation, is illustrated in the drawing as " North Spin Generator", while the spin generator 11 is illustrated in the drawing as "-South Spin Generator."

The spin generator 10 resides in a first unidirectional magnetic field aligned along a first fixed axis in a known manner. A first container ( not shown), within the field, encloses two sets of dissimilar subatomic particles each exhibiting magnetic resonance when properly excited. The first container is irradiated with energy at the resonance frequency of at least one of the sets of particles. An alternating magnetic field, associated with the first unidirectional field, is produced having a frequency equal to the Larmor frequency of each set of particles to cause forced precession of magnetic moments of the particles about the axis. The precessional frequencies of the magnetic moments of the substances can be detected and read out. The magnetic field strength of the unidirectional field can be varied.

Similarly, the second spin generator 11 has a unidirectional magnetic field substantially equal to the first unidirectional field aligned along a second fixed axis parallel to, or identical with, the first fixed axis and in a direction opposite to the first unidirectional field. A second container within the second unidirectional field encloses dissimilar subatomic particles corresponding to those enclosed in the first container. The second spin generator is irradiated with energy at the resonance frequency of at least one of the sets of particles. An alternating magnetic field, associated with the second spin generator undirectional field, is produced having a frequency equal to the Larmor frequency of each set of particles, to cause forced precession of the magnetic moments of the particles about the second spin generator fixed axis. The precessional frequencies of the magnetic moments of the substances can be detected and read out. Similarly, the magnetic field strength can be varied so as to eliminate any requirement for an independent knowledge of the absolute field magnitude of the spin generators 10, 11.

The subatomic particles enclosed by the containers within both spin generator 10, 11 can be two different mercury isotopes, whereby, in a preferred embodiment, the spin generators 10, 11 have resonant frequencies at both 1 kilohertz and 369 hertz. Samples of both mercury isotopes are in each container.

Referring again to FIG. 1, there is shown a crystal oscillator and squaring circuit 12 having a fixed frequency of 1, 024,000 hertz. The circuit 12 provides pulses therefrom at a rate of 1.024 megahertz.

The output of the 1.024 megahertz circuit 12 is coupled to a $2^{10}$ frequency dividing circuit 13 which provides outputs along 10 parallel lines therefrom. The circuit 13, thus, is cyclic at a 1 kilohertz rate.

It is desired to phase lock the output of the 1.024 megahertz circuit 12 with the 1 kilohertz output frequency generated by the north spin generator 10. This can be achieved by a phase locking circuit, including as an element thereof, the north spin generator 10 itself which includes a direct current field. The frequency output of the north spin generator 10 is proportional to the magnetic field, and, since the magnetic field can be varied, the frequency output, or phase thereof, can be varied.

The north spin generator 10 is coupled to a first 1 kilohertz filter, squaring, and differentiating circuit 14. The north 1 khz filter and squaring and differentiating circuit 14 produces spike-like pulses therefrom at substantially a 1 kilohertz rate, synchronously with corresponding signals generated by the north spin generator 10.

A "north field error" 10 flip flop register 16 has its inputs coupled to the frequency dividing circuit 13. The output of the 1 kilohertz circuit 14 is coupled to strobe the signals applied to the input of the error register 16. Thus, the output of the frequency dividing circuit 13 is sampled at a rate corresponding to the output of the differentiating circuit 14. Assuming that the frequency rate of the differentiating circuit 14 ( and hence, the frequency rate from the north spin generator 10) is identical to the cyclic rate of the dividing circuit 13, then no phase differential exists therebetween, and the same number would be strobed into the register 16 every time it was strobed.

The output of the error register 16 is coupled to a proportional field control 17, shown in dotted outline, for controlling the unidirectional field of the north spin generator 10.

The proportional field control 17 includes a digital to analog converter 18 serially connected to an integrator 19, including an operational amplifier 21 and a capacitor 22 shunted thereacross. The output of the integrator 19 is coupled to the unidirectional field winding of the north spin generator 10 for controlling the unidirectional magnetic field thereof.

The loop including the 1 kilohertz circuit 14, the error register 16, the proportional field control 17, and the spin generator 10 itself, is self-controlling, in that when any change in phase tends to occur between the north spin generator 10 and the output from the frequency dividing circuit 13, the loop tends to bring it into phase. Although the phase of the north spin generator 10 might not be exactly in phase with the frequency dividing circuit 13, the phase difference between the two will normally (in the absence of rotation) remain constant. This operation sets up the north $H_{01}$ field (that is, the direct current unidirectional field) so that the north field acts as a reference.

The south spin generator 11 is coupled to a second 1 kilohertz filter, squaring, and differentiating circuit 23. The south one kilohertz filter, squaring, and differentiating circuit 23 produces spike-like pulses therefrom at substantially a one kilohertz rate, synchronously with the corresponding signals generated by the south spin generator 11.

A "1,000 hertz phase difference" 10 flip flop register 24 has its inputs coupled to the frequency dividing circuit 13. The output of the south one kilohertz circuit 23 is coupled to strobe the signals applied to the input of the phase difference register 24. Thus, the output of the frequency dividing circuit 13 is sampled at a rate corresponding to the output of the differentiating circuit 23. Assuming that the frequency of the differentiating circuit 23 (and,hence, the frequency from the south spin generator 11) is identical to the cyclic rate of the dividing circuit 13, then a constant phase relationship exists therebetween, and the same number would be strobed into the register 24 every time it was strobed. This number is indicative of the phase difference between the two spin generators.

The north spin generator 10 is coupled to a first 369 hertz filter squaring and differentiating circuit 26. The north 369 hertz filter and differentiating circuit 26 produces spike-like pulses therefrom at substantially a 369 hertz rate synchronously with the corresponding signals generated by the north spin generator 10.

Similarly, the south spin generator 11 is coupled to another 369 hertz filter and squaring and differentiating circuit 27. The south 369 hertz filter and squaring and differentiating circuit 27 produces spike-like pulses therefrom at substantially a 369 hertz rate synchronously with the corresponding signals generated by the south spin generator 11.

The north 1 kilohertz filter and squaring and differentiating circuit 14, the south 1 kilohertz filter and squaring and differentiating circuit 23, the north 369 hertz filter and squaring and differentiating circuit 26 , and the south 369 hertz filter and squaring and differentiating circuit 27 can be referred to generically as first, second, third, and fourth strobing means, respectively.

Referring again to FIG. 1, there is shown another crystal oscillator and squaring circuit 28 having a fixed frequency of 377,856 hertz. The circuit 28 provides pulses therefrom at a rate of 377,856 hertz.

The output of the 377,856 hertz circuit 28 is coupled through a proportional advance or retard circuit 29, shown in dotted outline, to another $2^{10}$ frequency dividing circuit 31 which provides outputs along 10 parallel lines therefrom. The circuit 31, thus, is cyclic at a 369 hertz rate.

It is desired to maintain the output of the second frequency dividing circuit 31 in synchronism with the nominal 369 hertz frequency from the north spin generator 10. This can be achieved by a closed loop including the proportional advance or retard circuit 29, the frequency dividing circuit 31, and a "North Phase Tracking Error" 10 flip flop register 32, to which the strobing pulses from the circuit 26 are applied.

The "North Phase Tracking Error" 10 flip flop register 32 has its inputs coupled to the frequency dividing circuit 31. The output of the 369 circuit 26 is coupled to strobe the signals applied to the input of the error register 32. Thus, the output of the frequency dividing circuit 31 is sampled at a rate corresponding to the output of the differentiating circuit 26. Assuming that the frequency rate of the differentiating circuit 26 (and hence, the frequency rate from the north spin generator 10) is identical to the cyclic rate of the dividing circuit 31 then no phase differential exists therebetween and the same number would be strobed into the register 32 everytime it was strobed.

The proportional advance or retard means 29 has an input coupled to the crystal oscillator circuit 28 and has its output coupled to the second dividing circuit 31. The proportional advance or retard means 29 is controlled by signals from the output of the error register 32 for adding or deleting pulses to the second dividing circuit 31 so that the second dividing circuit 31 comes into synchronism with the nominal 369 hertz frequency of the north spin generator 10.

The output from the 10 flip flop register 32 carries thereon 10 lines. One of the lines carries a "sign" bit, wherein a zero thereon indicates a positive number and a 1 thereon indicates a negative number. The remaining nine lines of the flip flop register 32 carry the numerical data. Such numerical data, when positive, represents the absolute quantity stored in the register 32, and, when negative, the nine lines from the register 32 present the ones complement of the absolute number stored therein.

The proportional advance or retard means 29 includes nine half adders 33 shown in the drawing as a single block. These nine half adders can be nine separate circuits if so desired. One input of each of the nine half adders is coupled to a corresponding one of the nine lines from the error register 32. The second inputs of each of the nine adders are coupled to the output of the inverter 34. The input of the inverter 34 is coupled to receive the sign bit from the error register 32. Thus, the outputs from the nine half adders 33 represents the negative of the absolute value that was stored into the 10 flip flop register 32.

The outputs of the nine half adders 33 are coupled to a counter 36 and are gated thereinto by a delayed pulse from the strobing circuit 26. A strobing pulse from the circuit 26 is delayed by a suitable delay means 37 which is applied to the counter 36 so as to gate the outputs from the half adders 33 into the counter 36 in a known manner.

The nine $\overline{Q}$ outputs from the counter 36 are coupled as nine inputs to a NOR circuit 38.

The NOR circuit 38 and other NOR circuits illustrated in the FIG. are shown conventionally as enclosed semicircles. The NOR circuits are logical devices in which, with a signal A and a signal B applied to its inputs, an output of $\overline{AB}$ is obtained. Thus, the output of a NOR gate is high when any of the inputs are low, and is low only when all of the inputs are high.

The output from the nine-input NOR circuit 38 is coupled to a first two-input NOR circuit 39, a second two-input NOR circuit 41, and to one input of a three-input NOR circuit 42. Pulses from the 377,856 oscillator and squaring circuit 28 are coupled to the other input of the NOR circuit 39, the output of the NOR circuit 39 being coupled to the counter 36.

Thus, assuming the counter 36 is at a zero condition and that the counter 36 $\overline{Q}$ outputs are all 1's, the counter trigger input is inhibited. With a number, other than all zeros stored in the counter 36, trigger pulses are permitted to enter the counter. The counter 36 counts up to zero at the trigger rate applied thereto, the trigger rate being at the 377,856 hertz frequency determined by the oscillator 28. When the counter arrives at zero, the trigger pulses cease due to the output of the gate 38 inhibiting the gate 39. Thus, the number of trigger pulses applied to the counter 36 equals the number previously read into the counter. The counter 36 generates a number of pulses equal to the number applied thereto.

The sign bit from the register 32 is coupled through the inverter 34 to the half adders 33 as described heretobefore. In addition, the output from the inverter 34 is coupled to the second input of the NOR circuit 41 and to an inverter 43. The output of the inverter 43 is coupled to a second input of the three-input NOR circuit 42.

The output from the oscillator 28 is coupled through 180° delay 44 to a third input of the NOR circuit 42. The delay 44, in the embodiment described, has a delay of 1/755,712 second. This is equivalent to 1/(2×377,85 6 hz).

The output from the two-input NOR circuit 41 is coupled to a two-input NOR circuit 46 having its other input coupled to receive pulses from the oscillator 28. The output from the NOR circuit 46 and the output from the NOR circuit 42 are coupled as inputs to another NOR circuit 47 whose output is coupled to the frequency dividing circuit 31.

With the counter 36 at rest in the zero state, 377,856 hertz pulses are fed straight through the gates 46 and 47 to the frequency dividing circuit 31. However, when an error exists, that is, when the counter is no longer at its all zero condition, it is desired to either inhibit some of the 377,856 hertz trigger pulses to retard the counter 36, or it is desired to insert between them additional pulses to advance the phase, depending on whether or not the sign of the error signal is negative or positive. Thus, the gates 41, 46, 47, and 42 permit clock pulses at the 377,856 hertz rate to pass when the sign bit is negative (1) and inhibits the clock when a positive (zero) sign bit indicates that phase error is ahead and that the signal must be retarded. Similarly, an extra clock pulse delayed 180° is inserted by the gates 41, 46, 47, and 42 whenever the sign bit is negative.

A "369 hertz phase difference" 10 flip flop register 48 has input terminals coupled to the output of the second dividing circuit 31 and has a strobing terminal coupled to the strobing circuit 27 for gating signals from the second dividing circuit 31 thereinto.

The north spin generator 10 and the south spin generator 11 are maintained in synchronism through the means of a digital subtractor circuit 49 coupled to the outputs of the flip flop registers 24, 48 for providing a difference signal therefrom.

The output from the digital subtractor circuit 49 is coupled to a proportional field control circuit 51, shown in dotted outline, for controlling the unidirectional field of the south spin generator 11.

The proportional field control 51 includes a digital to analog converter 55 connected to an integrator 53, including an operational amplifier 54 and a capacitor 56 shunted thereacross. The output of the integrator 53 is coupled to the unidirectional field winding of the south spin generator 11 for controlling the unidirectional magnetic field thereof.

Digital adding means 57 are coupled to the outputs of the registers 24 and 28 for providing a summing signal therefrom indicative of an inertial output reference. The summing signal from the digital adding means 57 can be coupled to an averaging circuit 58, shown in dotted outline, for providing signals therefrom indicative of average data.

The averaging circuit 58, in one embodiment, includes an adding circuit 61 which is coupled to an input of a multi-stage register 52. The output from the adding circuit 61 can be gated into the register 52. A subtracting circuit 62 is provided having the output thereof coupled to one input of the adding circuit 61. The output from the register 52 can be coupled as a second input to the adding circuit 61. A right shifting means 63 also is coupled to the output of the register 52, which shifts the binary number from the register to the right $n$ digits, which is, in effect, a division of the output number of register 52 by $2^n$. The output of the right shift means 63 is coupled into the subtracting input of the subtractor 62, whose other input is coupled to the output of the digital adding means 57. Thus, as so presented, the output from the subtracting circuit 62 represents differential data of the inertial output reference and can be provided as an output signal to other electronic circuitry or control circuitry, not shown.

It is desired to phase lock the north spin generator 10 with respect to the crystal oscillator 12. Assuming for the moment that no rotation takes place, the output signals from the phase difference register 24 remains constant. Since the two oscillators 12 and 28 are not coherent with each other, minor differences will occur. The phase differences that occur between the two oscillators can be adjusted through the use of the proportional advance and retard circuit 29. Thus, the actual output of the proportional advance and retard circuit 29 maintains an average frequency corresponding to the 369 hertz signal from the strobing circuit 26. In accordance with the phase difference between the two signal provided by the frequency dividing circuits 13–31, the south $H_{01}$ field can be controlled. Although the two signals were originally of different frequencies, what is really desired is a phase difference in degrees so that, in reality, phase angles are being compared. What will be obtained is a fixed difference, and this fixed difference from the digital subtracting circuit 49 controls the south spin generator 11 so that the absolute magnitude of the unidirectional magnetic fields of the north spin generator 10 and the south spin generator 11 is immaterial.

The quantity read out from the digital subtractor circuit 49 normally is constant. However, when the overall system is rotated about the fixed axis, both phase angles change. However, they change in the same direction so that the difference in the phase angles remains constant. By summing the two phase angles, or signals, from the registers 24 and 48, signals are provided indicative of the inertial reference in the inertial state.

In summary, each spin generator 10, 11 produces paired signals nominally at 1 kilohertz and 369 hertz.

Each spin generator 10–11 is accompanied by a pair of filters, squaring circuits, and differentiators 14, 26 and 23, 27 so that four triggering pulse trains basically come from the two spin generators 10, 11: a 1 kilohertz and a 369 hertz from the north, and a 1 kilohertz and a 369 hertz from the south.

The 1.024 megahertz crystal oscillator 12 provides a clock for driving the binary $2^{10}$ frequency dividing circuit 13. Two 10-bit parallel loading registers 16, 24 strobe the contents of the frequency dividing circuit 13. The register 16 represents the field error and is used to control the north or $H_{01}$ field and actually phase locks the north 1 kilohertz signal to the 1 kilohertz output of the frequency dividing circuit 13 such that the 1 kilohertz north strobing pulse coincides with the carry of the dividing circuit 13. When it does so coincide, coincidentally, the contents of the frequency dividing circuit 13 are at all zeros. If it does not coincide, the number in the dividing circuit 13 is, by the action of the strobe pulses, transferred to the north field error shift register 16. This number is the error in the phase of the 1,000 hertz spin generator 10 output, the most significant bit being the sign bit and 512 counts being equivalent to 180°. This number is shifted everytime it appears, 1,000 times per second, into the proportional field control for the north $H_{01}$ field to adjust the phase of the 1 kilohertz output.

The proportional field control 17 includes a digital to analog converter 18 for controlling the field current in the corresponding winding in the spin generator 10 for purposes of acquisition. The south 1 kilohertz strobe pulse similarly gates the second output of the frequency dividing circuit 13 into the 1 kilohertz phase difference register 24. The strobe is coherent with the dividing circuit 13 as the frequencies are the same. The output is simply the phase difference.

On the 369 hertz side, the crystal oscillator 28 at 377,856 hertz drives, through the proportional advance or retard circuit 29, the frequency dividing circuit 31 similar to the one on the 1 kilohertz side. The output of this counter 31 is approximately but not necessarily exactly coherent with the 369 hertz strobe from the north spin generator 10. The output of the circuit 31 is phase locked to the strobe via the north 369 hertz phase tracking error register 32 and the proportional advance or retard circuit 29. The number strobed into the north phase tracking error register 32 has the identical scale as the register 16. After each strobe pulse, a new number is shifted into the proportional advance or retard circuit 29; the output phase of the frequency dividing circuit 31 is either advanced or retarded by an amount proportional to the exact number of bits contained in the error register 32. To retard the phase, the error number is counted down to zero while an equal number of 377,856 hertz pulses are inhibited from the circuit 31. To advance the phase, extra pulses are inserted between the regular pulses for the same number of times as it takes to re-zero the error number just shifted in.

The number in the circuit 31 is strobed into the phase difference register 48 by the strobed pulse from the south spin generator 11.

Thus, the two registers 24, 48 contain, (1), the instantaneous difference in phase between the north and south 1 kilohertz spin generators and, (2), the phase difference between the north and south 369 hertz spin generators. The units are the same: (degrees) × 1,024/360. It remains but to shift them through the difference adder 49 and to take the resultant number and sign into the south field proportional field control similar to the one in the north.

Then, with those loops closed, the phase difference registers 24 and 48 are coupled through the digital adding means 57 to obtain the nuclear inertial output reference.

Since the data read out from the digital adding means 57 tends to be somewhat noisy, it is desired to filter the noise with a digital filter. The output averaging filter 58 acts as a lowpass filter. The adder 61 receives the output from the register 52. The adder also receives a number from the subtractor circuit 62. The number in the register 52 then is increased or decreased every sample period by the output of the difference circuit 62, depending on whether the output of the difference circuit is positive or negative. If the output of the difference circuit 62 is zero, the number in the register 52 is unchanged. The output of the register 52 also goes to a right shift means 63. The right shift means 63 shifts the binary number from the register 52 to the right $n$ digits, which is, in effect, a division of the output number in the register 52 by $2^n$. The output of the right shift means 63 is inserted into the subtracting input of the subtractor 62, and is thus subtracted from the other input to the difference circuit 62.

If the number from the adding circuit 57 is exactly equal to the number at the output of the right shift circuit 63, then the output of the subtracting circuit 62 is zero and the number in the register 52 will not change. Under these circumstances, the number in the register will equal exactly $2^n$ times the number input from the adding circuit 57 and the output of the averaging circuit 58, which is also the output of the right shift circuit, will also equal the input of the averaging circuit.

If the number at the input to the averaging circuit 57 changes, then the number at the output of the averaging circuit will also change but not as rapidly as the input. Thus, the output will change exponentially, and the output will be the average of the input.

When the output of the averaging circuit 58 does not equal the input, there will be an output from the subtracting circuit 62 equal the difference between the input to the averaging circuit 58 and its output. This difference is proportional to the rate of change of the output of the right shift circuit 63 and also to the rate of change of the input to the averaging circuit 58. This differential output corresponds to the high pass output of the digital filter, and the output of the right shift circuit 63 corresponds to the low-pass output. Ordinarily, it is desired not to use the raw data that is present from digital adding means 57, but to make use of the average data which takes place over a period of time, so that noise distortions are eliminated.

DESCRIPTION OF ANOTHER EMBODIMENT

Figure 2:
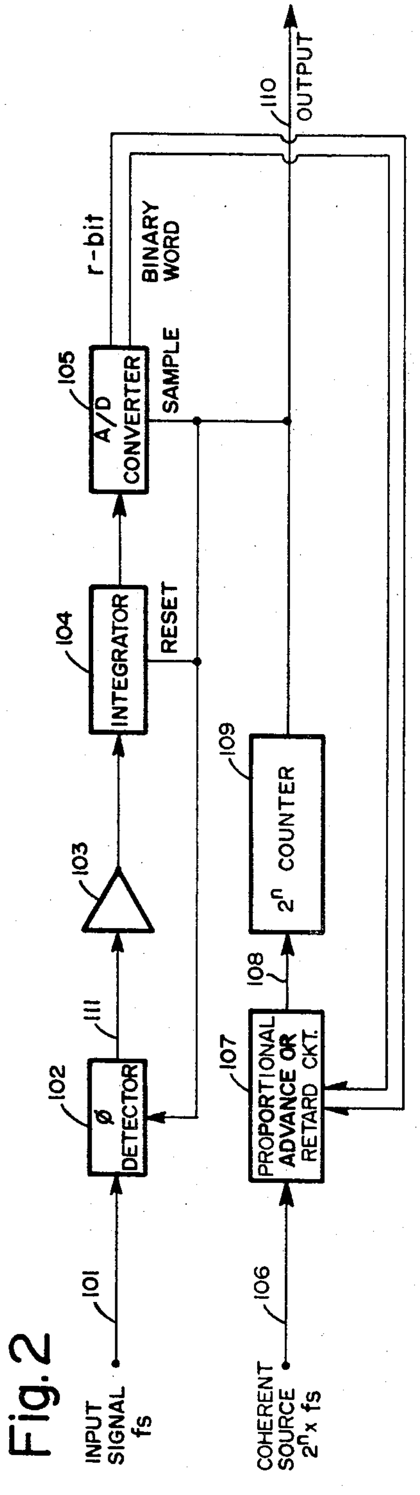

Referring to FIG. 2, an input signal at a frequency $f_s$, in which it is desired to track and measure the phase, is applied on the line 101. This input signal $f_s$ enters a phase detector 102, the output of which is amplified by an amplifier 103, and then is integrated by a resetable integrator 104. The output of the integrator 104 is coupled to an analog to digital converter 105 whose output, an $r$-bit binary signal, enters a control device 107 which advances or retards the phase of the output signal on a line 110 proportional to the measured phase error. A clock signal with a frequency of $2^n \times f_s$ on a line 106, coming from a source which is coherent with or very nearly coherent with the input signal $f_s$, is processed by the control circuit 107 to provide a driving signal on a line 108 for an $n$-stage binary counter 109. The clock signal gets divided by the $2^n$ counter 109 and provides an output square wave on the line 110 which provides a reference for the phase detector 102, a reset command for the integrator 104, and a sample command for the analog to digital converter 105.

Figure 3:
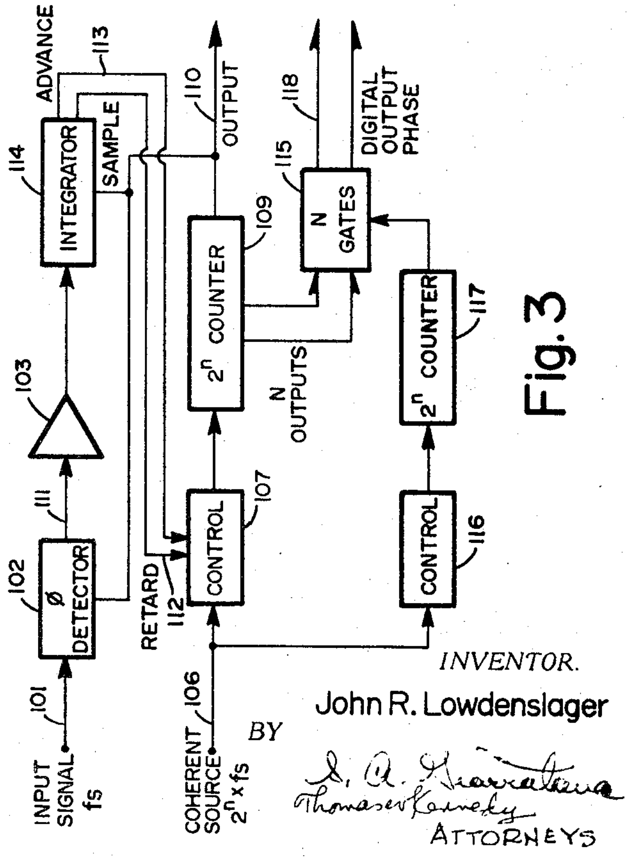

In an alternate construction, as shown in FIG. 3, wherein corresponding reference numerals indicate corresponding parts as shown in FIG. 2, a level descriminator 114 is utilized in lieu of an analog to digital converter to provide simple advance and retard signals 112, 113 to the control 107. A digital output phase on lines 118 is also shown. A reference wave form, coming from another $2^n$ counter 117, driven by a control 116, strobes $n$ gates 115 to which are provided the $n$ outputs of the $2^n$ counter 109 to provide an $n$-bit parallel digital output phase angle on the lines 118.

In operation, the circuits of FIGS. 2 and 3 function as follows: The input signal on the line 101 is detected by the phase detector 102. The phase error signal is amplified by the dc amplifier 103 and enters the integrator 104 (FIG. 2). This signal is integrated only over one cycle of the output signal and the integrator 104 is sampled by the analog to digital converter 105 and reset. The analog to digital converter 105 may be simply constructed depending upon the nature of the input signal and the requirement for averaging it. FIG. 3 illustrates the limit where the level discriminator 114 is considered an analog to digital converter recognizing only two values of the input signal.

The $r$-bit binary phase error number, as shown in FIG. 2, can be transmitted in parallel or in series to the control device 107. The function of the control device 107 is to supply clocked pulses on the line 108 to the $2^n$ counter 109. When the input phase is fixed and the frequency of the clock is exactly $2^n \times f_s$, the phase of the output of the $2^n$ counter 109 remains fixed with respect to the input signal. Note, that for perfect tracking, the clock source should be exactly coherent, that is, the input signal and the signal source at $2^n \times f_s$ should be derived from the same oscillator or from phase locked oscillators. By occasionally inhibiting individual clock pulses in the signal that drives the $2^n$ counter 109, the phase of the output can be retarded with respect to the phase of the input signal in steps of $360°/2^n$. Thus, if $n$ equals 10, the incremental steps are about 0.351°.

Similarly, by including occasional extra clock pulses in a signal that drives the $2^n$ counter 109, the phase of the output can be advanced with respect to the input signal.

Thus, when the error measured by the phase detector is $x$ units in the $r$-bit error code coming from the $a$–$d$ converter 105, the control unit 107 retards or advances the $2^n$ counter 109 by inhibiting or supplying extra $x$ pulses. Typically, the amount of correction that occurs deviates slightly from the measured error so that a degree of averaging is provided.

By using the level discriminator 114, as shown in FIG. 3, the control 107 simply adds one extra pulse or inhibits one pulse.

A digital output can be provided by comparing the number in the $2^n$ counter 109 with another signal at the frequency $f_s$ as a phase reference. FIG. 3 indicates one such application where a second control 116 and another $2^n$ counter 117 represent either a coherent phase reference or another phase lock process such as a calibrating phase. The phase difference between the output of the counter 117 and the counter 109 is numerically equal (in counter units) to the instantaneous difference between the numbers stored in the counters 109, 117. These numbers are changing very rapidly, requiring an efficient manner for extracting the phase difference: The output of the counter 117 is used to strobe the output of the counter 109; everytime the counter 117 passes through the binary $2^n$ value and resets to zero, the gates 115 are opened, the number strobed out from the gates represents the phase difference.

Therefore, the digital output gives the difference between the input signal phase and the reference phase, once every cycle of the input signal.

Figure 4:
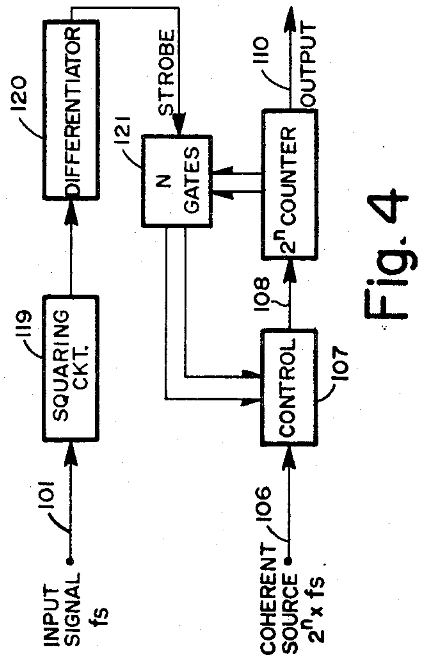

Another form of the invention is illustrated in FIG. 4, where an input signal is relatively clean and free from noise. The input signal 101 is squared in a limiter or a clipper and an amplifier 119, and either the leading or the trailing edge is differentiated in a differentiator 120. The resulting pulse is used to strobe n gates 121 which samples the number in the counter 109, transferring an error signal to the control unit 107 which either advances or retards the phase of the $2^n$ counter, so that the carry of the counter (which occurs when the number in the counter reaches $2^n$ binary and resets to zero) is made to coincide with the strobe pulse, and thus the output waveform of the $2^n$ counter 109 is made to track the input signal phase.

Thus, the phase locked loops of FIGS. 2, 3, and 4 operate as perfect integrators: the output waveforms have a precise 50 percent duty cycle. The digital output is immediately available once every cycle of the output or oftener, if desired.

Advantageously, with the phase lock circuits of FIG. 2, 3, and 4, a binary counter is used as a phase integrator in a phase locked loop. The phase of the counter output is precisely controlled by insertion of extra clock pulses to advance the phase, or by inhibition of clock pulses to retard the phase. The output of the phase loop is provided digitally by strobing the integrator.

The proportional advance or retard control device 107 of FIGS. 2, 3, 4 simply advances or retards the phase of the signal applied to it. Circuitry similar to the circuit 29 can be used as the control device 107.

The coherent source operates at $2^n \times f_s$. The value of $n$ can represent any positive integer. However, when $n$=1, then only two possible phases occur: 0° and 180° out of phase. When $n$=2, then four possible phases occur: 0°, 90°, 180°, and 270°. When $n=3$ eight possible phases occur: 0°, 45°, 90°, 135°, etc. The value of $n$ is dependent upon what kind of phase resolution is desired. When $n=1$, phase resolution to approximately that of milliradian is obtainable. When $n=5$, phase resolutions of about 11.25 are obtainable. In other words, resolutions are obtained with a resolution of $360°/2^n$. It will be apparent that various modifications may be performed without departing from the spirit and scope of this invention. For example, digital phase locked loop circuitry can be used in systems other than nuclear gyroscopic instrumentation.

I claim:

1. In combination,

A. a north nuclear spin generator having a field control therefore, an upper output frequency, and a lower output frequency;

B. a first strobing means coupled to the north spin generator for providing strobing signals at the upper frequency rate;

C. a crystal oscillator;

D. means for phase locking said crystal oscillator to said north spin generator upper frequency, 1. a frequency dividing circuit adapted to receive the output from said crystal oscillator and to provide a binary output therefrom at the same frequency as the north spin generator upper frequency, 2. a first error register, adapted to receive the binary outputsfrom said dividing circuit, said register adapted to receive a strobing signal from said first strobing means, and 3. means coupling the output of said error register to control proportionally the field for said north spin generator;

E. a south spin generator having a field control therefore;

F. a second error register coupled to receive the output from said dividing circuit;

G. means coupled to said south spin generator for strobing the signal applied to said second error register, whereby said second error register provides an output therefrom indicative of the phase difference between said south spin generator and said north spin generator;

H. a second crystal oscillator adapted to oscillate at a frequency other than said first crystal oscillator;

I. a second dividing circuit;

J. means for coupling the output of said second oscillator to said second dividing circuit;

K. a third error register;

L. means coupled to said north spin generator for applying a strobe pulse to said third error register; so that synchronization of the output of said second dividing circuit with said strobing signals occurs;

M. means for phase locking the output of said second dividing circuit to the strobe pulse applied to said third register and said coupling means so that the signal strobed into the third register has the identical scale as the first error register;

1. whereby said means for coupling, after each strobe pulse, shifts a new number therethrough, the output phase of said second dividing circuit being either advanced or retarded by the number stored in said third error register;

N. a fourth error register;

O. means for strobing the output of said second dividing circuit into said fourth error register, said means for strobing being controlled by said south spin generator;

P. means for coupling the output from said second error register and the output from said fourth error register, combining them through a subtractor circuit, and coupling the output of said subtractor circuit to control the field of said south spin generator; and Q. an adder coupled to receive the outputs from said second and fourth error registers for providing an output therefrom indicative of the inertial output reference.

2. In combination,

A. a first spin generator having 1. a first unidirectional magnetic field aligned along a first fixed axis, 2. a first container, located in said field, enclosing two sets of dissimilar subatomic particles, each exhibiting magnetic resonance when properly excited;

3. means for irradiating said first container with energy at the resonance frequency of at least one of said sets of particles, 4. means for producing an alternating magnetic field, associated with said first unidirectional field, having a frequency equal to the Larmor frequency of each set of particles to cause forced precession of magnetic moments of said particles about said axis, 5. means for varying said unidirectional field, and 6. means for detecting the precessional frequencies of said particles, the precessional frequency of one set of particles having a nominal frequency $f_1$, the precessional frequency of the other set of particles having a nominal frequency $f_2$;

B. a second spin generator having 1. a unidirectional magnetic field substantially equal to said first unidirectional field aligned along fixed axis parallel to said first fixed axis and in a direction opposite to said first unidirectional field, 2. a container enclosing dissimilar subatomic particles, corresponding to those enclosed by said first container, 3. means for irradiating the second spin generator container with energy at the resonance frequency of at least one of said sets of particles, 4. means for producing an alternating magnetic field, associated with the second spin generator unidirectional field, having a frequency equal to the Larmor frequency of each set of particles to cause forced precession of magnetic moments of said particles about the second spin generator fixed axis, 5. means for varying the second spin generator unidirectional field, and 6. means for detecting the precessional frequencies of said particles, the precessional frequency of one set of particles having said nominal frequency $f_1$, the precessional frequency of the other set of particles having said nominal frequency $f_2$;

C. a first strobing means coupled to said detecting means of said first spin generator, including a filter at the frequency $f_1$, and pulse shaping means, for providing strobing pulses at said nominal frequency $f_1$ in synchronism with said first spin generator;

D. a second strobing means coupled to said detecting means of said second spin generator, including a filter at the frequency $f_1$, and pulse shaping means, for providing strobing pulses at said nominal frequency $f_1$ in synchronism with said second spin generator;

E. a third strobing means coupled to said detecting means of said first spin generator, including a filter at the frequency $f_2$, and pulse shaping means, for providing strobing pulses at said nominal frequency $f_2$ in synchronism with said first spin generator;

F. a fourth strobing means coupled to said detecting means of said second spin generator, including a filter at the frequency $f_2$, and pulse shaping means, for providing strobing pulses at said nominal frequency $f_2$ in synchronism with said second spin generator;

G. a first crystal oscillator having a resonance frequency $2^n f_2$, wherein $n$ is a positive integer;

H. a second crystal oscillator having a resonance frequency $2^n f_2$;

I. a first frequency dividng circuit, coupled to said first crystal oscillator, and adapted to provide a binary output along $n$ output lines therefrom at a cyclic rate $f_1$;

J. a second frequency dividing circuit, coupled to said second crystal oscillator, and adapted to provide a binary output along $n$ output lines therefrom at a cyclic rate $f_2$;

K. means for phase locking the nominal frequency $f_1$ from the first spin generator in synchronism with said first crystal oscillator, including 1. a first $n$ stage flip flop register having input terminals coupled to said first frequency dividing circuit, a strobing terminal coupled to said first strobing means for gating signals from said first dividing circuit into the register, and an output therefrom, and
2. means coupled to the output of said n stage flip flop register for controlling said first spin generator unidirectional field varying means;

L. means for maintaining the output of said second frequency dividing circuit in synchronism with the nominal frequency $f_2$ from said first spin generator, including 1. a second $n$ stage flip flop register having input terminals coupled to said second frequency dividing circuit, a strobing terminal coupled to said third strobing means for gating signals from said second dividing circuit thereinto, and an output therefrom, and
2. a proportional advance or retard means having an input coupled to said second crystal oscillator, an output coupled to said second dividing circuit, and control inputs coupled to the output of said second $n$ stage register for adding or deleting pulses to second dividing circuit so that said second dividing circuit comes into synchronism with the nominal frequency $f_2$ of the first spin generator;

M. a third $n$ stage flip flop register having input terminals coupled to the output of said first dividing circuit, and having a strobing terminal coupled to said second strobing means for gating signals from said first dividing circuit thereinto, and an output therefrom;

N. a fourth $n$ stage flip flop register having input terminals coupled to the output of said second dividing circuit, and having a strobing terminal coupled to said fourth strobing means for gating signals from the second dividing circuit thereinto, and an output therefrom;

O. means for maintaining the second spin generator in synchronism with said first spin generator including 1. a digital subtractor circuit coupled to the outputs of said third and fourth $n$ stage registers for providing a difference signal therefrom, and
2. means coupled to said difference signal for controlling said second spin generator unidirectional field varying means; and P. digital adding means coupled to the outputs of said third and fourth $n$ stage registers for providing a summing signal therefrom indicative of an inertial output reference.

3. The combination as recited in claim 2 further comprising an averaging circuit coupled to said digital adding means.

4. The combination as recited in claim 3 wherein said averaging circuit includes 1. an adding circuit having a first input terminal, a second input terminal, and an output terminal for providing an output signal thereon corresponding to the summation of signals presented on the two input terminals thereof;
2. a register having an input terminal coupled to the output of said adding circuit, and an output terminal, coupled to said first input terminal of said adding circuit wherein said register continually updates a binary number contained therein by adding or subtracting thereto the output of said adding circuit;
3. a right shifting means having an input terminal coupled to said output terminal of said averaging circuit register and an output terminal for providing signals indicative of average data corresponding to the inertial output reference wherein said right shifting means has the capability of shifting the binary number on its input terminal to the right an integral number of digits;
4. a subtracting circuit having a first input terminal coupled to the output terminal of said right shift means, a second input terminal coupled to the input of said averaging circuit, and an output terminal therefrom;
5. means for coupling the output terminal of said subtracting circuit to the second input terminal of said adding circuit, and for providing signals indicative of differential data of the inertial output reference; and
6. means for coupling the output terminal of said right shifting means to the second terminal of said substracting circuit.

5. In combination with a crystal oscillator having a resonance frequency $2^n f_1$; and a spin generator having a unidirectional magnetic field, aligned along a fixed axis, a container enclosing two sets of dissimilar sub-atomic particles, each exhibiting magnetic resonance when properly excited, located in said field, means for irradiating said container with energy at the resonance frequency of at least one of said sets of particles, means for producing an alternating magnetic field, associated with said unidirectional field, having a frequency equal to the Larmor frequency of each set of particles to cause forced precession of magnetic moments of said particles about said axis, means for varying said unidirectional field, and means for detecting the precessional frequency of said particles, the precessional frequency of one set of particles having a nominal frequency $f_1$;

means for phase locking the nominal frequency $f_1$, from the spin generator in synchronism with said crystal oscillator comprising 1. strobing means coupled to said detecting means of said spin generator, including a filter at the frequency $f_1$, and pulse shaping means, for providing strobing pulses at said nominal frequency $f_1$ in synchronism with said spin generator;
2. a frequency dividing circuit, coupled to said crystal oscillator, and adapted to provide a binary output along n output lines therefrom at a cyclic rate $f_1$;
3. a flip flop register having input terminals coupled to said frequency dividing circuit, a strobing terminal coupled to said strobing means for gating signals from said dividing circuit into the register, and an output therefrom; and
4. means coupled to the output of said flip flop register for controlling said spin generator undirectional field varying means.

* * * * *